United States Patent [19]

Vitaloni

[11] 4,331,883
[45] May 25, 1982

[54] PORTABLE POWER SUPPLY UNIT

[75] Inventor: Alberto Vitaloni, Turin, Italy

[73] Assignee: Grenco S.p.A., Turin, Italy

[21] Appl. No.: 199,128

[22] Filed: Oct. 22, 1980

[30] Foreign Application Priority Data

Oct. 29, 1979 [IT] Italy ................... 53693 B/79
Apr. 2, 1980 [IT] Italy ................... 67505 A/80

[51] Int. Cl.³ ............................................. B25F 3/00
[52] U.S. Cl. ................................. 307/150; 173/29; 173/46; 417/411
[58] Field of Search ............... 307/149, 150; 417/411; 173/29, 30, 46; 310/78, 92

[56] References Cited

FOREIGN PATENT DOCUMENTS

603317 8/1978 Switzerland .

Primary Examiner—Michael L. Gellner
Assistant Examiner—James L. Dwyer
Attorney, Agent, or Firm—Sughrue, Mion, Zinn, Macpeak and Seas

[57] ABSTRACT

The unit comprises a casing in the form of a portable box in which there are contained a pneumatic compressor and an electric motor for driving the compressor. The motor is a low voltage d.c. motor and in the casing there is also contained a transformer - rectifier combination for supplying both the motor and low voltage external utilizers. The shaft of the electric motor extends perpendicular to a wall of the casing and has, at an end accessible through an opening in this wall, a power take-off connectable to a mechanical utilizer. The shaft of the compressor is coaxial to the shaft of the motor and is coupled to the latter by means of a clutch. There are provided means for disengaging the clutch to prevent the shaft of the compressor being turned by the motor shaft when a mechanical utilizer is coupled to the power take off.

15 Claims, 11 Drawing Figures

PORTABLE POWER SUPPLY UNIT

The present invention relates to a portable power supply unit of the type comprising a casing in the form of a portable, substantially parallelepiped box in which are installed, among other things, a transformer/rectifier combination and a low voltage d.c. electric motor which can be selectively fed from a battery or from an a.c. distribution network (mains) through the transformer/rectifier combination. Downstream of the rectifier there is connected at least one output socket for the supply of low voltage d.c. electrical energy to external electrical utilisers, and for supplying the motor from the battery. The shaft of the electric motor extends perpendicular to one side wall of the casing and has, at an end accessible through an opening in this wall, a power take-off connectable to a mechanical utiliser, there being associated with the unit a reciprocating pneumatic compressor which can be driven by the motor.

From Swiss Pat. No. 603,317 there is known a portable unit of this type which includes, among other things, a power take-off to which a variety of mechanical utilisers are connectable, one of which is a reciprocating compressor.

The invention seeks to provide a compact unit of this type in which the compressor is permanently incorporated in a casing in the form of a box.

According to the invention, therefore, there is provided a unit of the type initially mentioned, characterised by the fact that the reciprocating pneumatic compressor is installed in the casing and the shaft of the compressor is mounted co-axially in the shaft of the motor and is connected to the shaft of the motor by means of a coupling, means being provided for disengaging the coupling to prevent the shaft of the compressor from being rotated by the motor shaft when a mechanical utiliser is coupled to the power take-off.

By having the shafts of the motor and the compressor co-axial it is possible to enclose the motor and compressor in a space of very small dimensions in a portable box in which there can possibly also be provided housings for other uses.

The possibility of preventing the compressor shaft from being turned by the motor shaft offers the advantage of avoiding a wasteful absorption of electrical power when use of the compressor is not wanted. This reduction of the absorbed power is particularly beneficial because it allows the unit to be provided with a motor of rather small dimensions and does not give rise to a consumption of electrical energy which could be unacceptable when the motor is supplied from a battery.

The characteristics of the unit according to the invention will become better understood from a reading of the detailed description which follows, which is made with reference to the annexed drawings which illustrate a preferred embodiment, given by way of non-limiting example, and in which:

Figure 1:
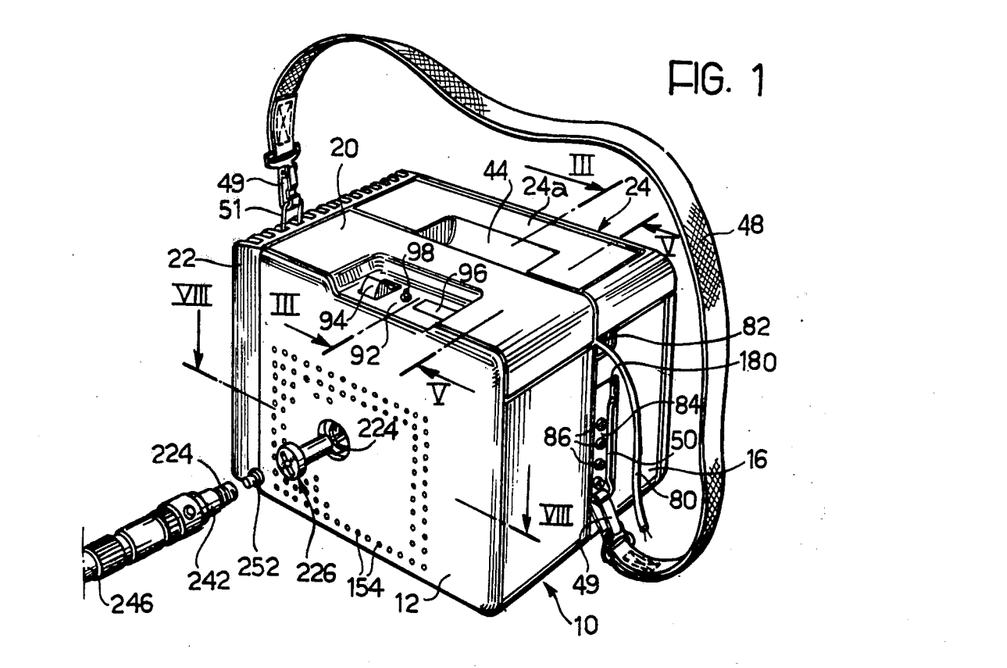
FIG. 1 is an external perspective view of the unit according to the invention, in which its front face is visible.
Figure 2:
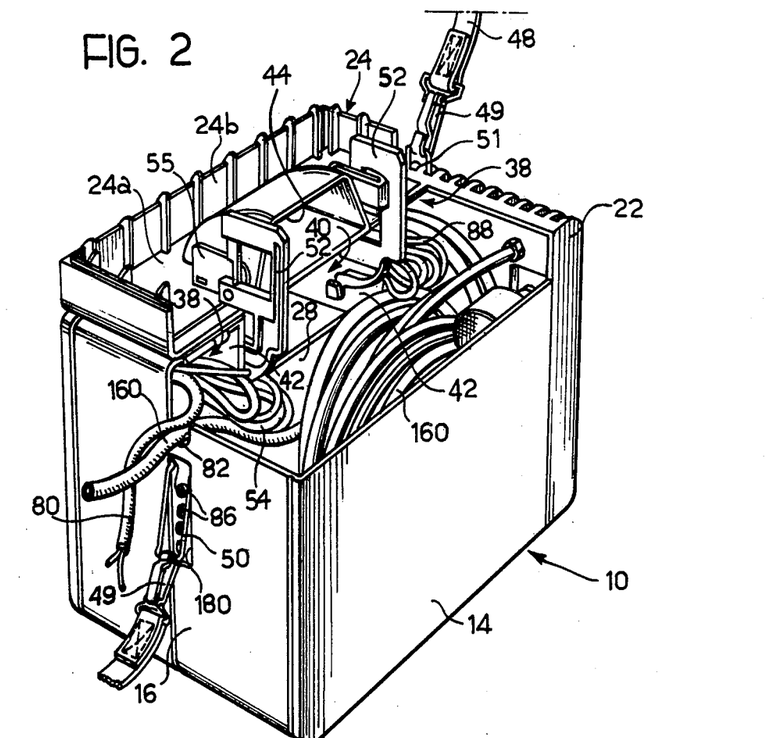
FIG. 2 is a perspective view of the same unit, in which a rear face is visible and in which the unit is shown with its upper lid turned back.
Figure 3:
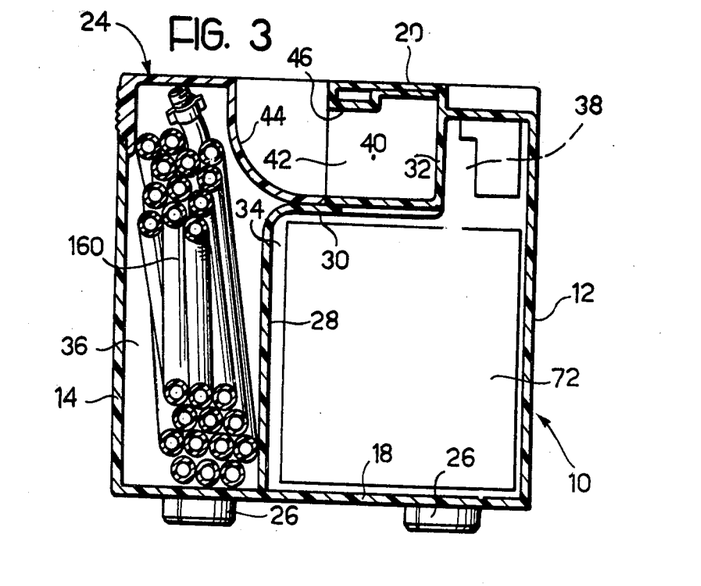
FIG. 3 is a transverse section taken on the vertical plane indicated by the line III—III of FIG. 1.

Referring to FIGS. 1 to 3, the unit illustrated comprises a casing 10 in the form of a box which is formed from several pieces of moulded plastics material.

The form of the casing 10 is substantially that of a parallelepiped formed so as to define, among other things, three side walls (front 12, rear 14 and end 16), a bottom wall 18 and a fixed upper wall part 20. A further end wall 22 of the casing is constituted by a finned element of heat-resistant, moulded plastics material. The function of this wall will be explained below.

The upper wall of the casing 10 is completed by an upper wall 24a of the hinged lid 24 which will be further described below.

The bottom wall 18 is provided with four support feet 26.

From the bottom wall 18 there extends upwardly a dividing wall 28 which is joined at the top to a horizontal wall border portion 30 extending towards the front wall 12. The horizontal border portion 30 is subdivided, adjacent the front wall 12, into two parts joined to this wall, whilst to the central part of the border portion 30 there is joined a further vertical wall 32 which extends to the upper wall 20.

The overall dividing wall 28, 30, 32 thus constituted separates the interior of the casing 10 into a pair of spaces, one of which is indicated 34. The other space comprises a part 36 which extends vertically along the interior of the rear wall 14, and an upper part underlying the wall 20 and subdivided into a pair of spaces 38. These latter are situated on the two sides of a central niche 40. This latter is defined by the horizontal wall portion 30, by the vertical wall 32 and by a pair of side walls 42 which separate it from the two lateral spaces 38.

The lid 24 has, at a position corresponding to that of the niche 40, a recess 44 which puts the niche 40 in communication with the outside. Under the upper wall 20 there is formed, in the niche 40, an element 46 of plastics material shaped in such a way as to form an enlarged border.

The niche 40 is intended to receive the fingers of a hand inserted into the recess 44. The enlarged border constituted by the element 46 serves as a carrying handle. The fixed part of the upper wall 20 and the corresponding part of the upper wall 24a of the lid 24 are separated along a median line and the niche 40 is formed centrally in the upper wall in such a way that the handle 46 is located substantially vertically above the centre of gravity of the whole unit to allow transport in a "balanced" state.

Another possibility for transport of the unit is given by a shoulder strap 48. The strap 48 is provided with end clips 49 which can be selectively hooked on to respective loops 50, 51 of metal wire. The loop 50 is located in a central zone of the end wall 16 and the loop 51 is located along the upper edge of the finned wall 22. We will return to the details of the mounting of the loops 50 and 51 below.

Figure 4:
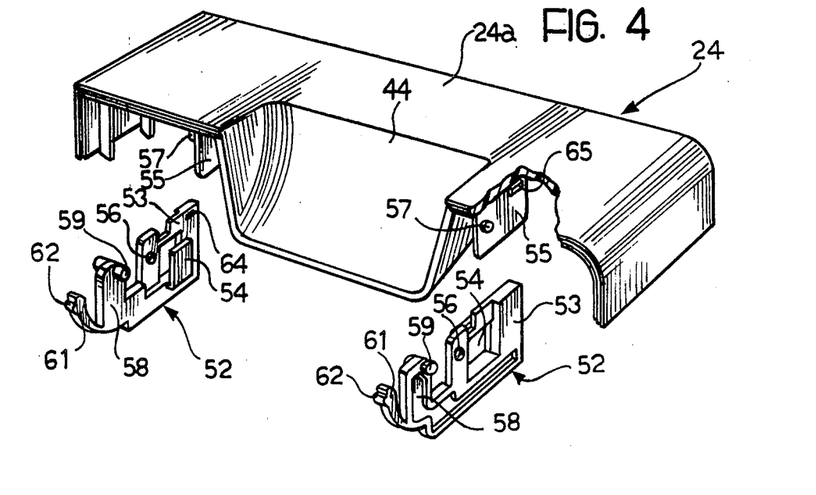
FIG. 4 is an exploded perspective view of a lid of the unit, and of its hinges.
Figure 5:
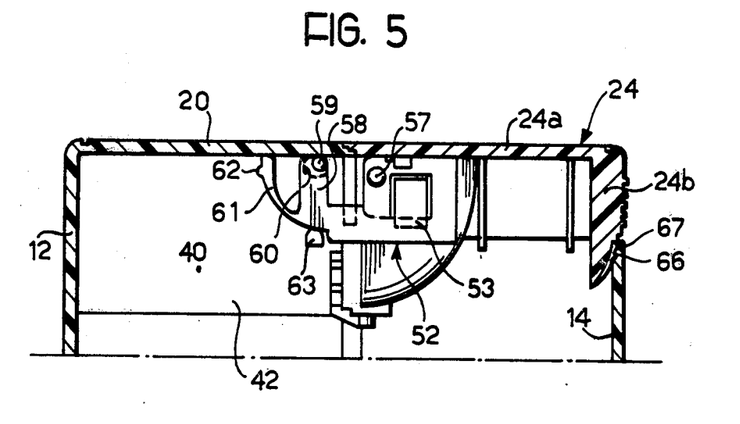
FIG. 5 is a partial section taken on the vertical plane indicated by the line V—V of FIG. 1, which shows the lid in its closed position.
Figure 6:
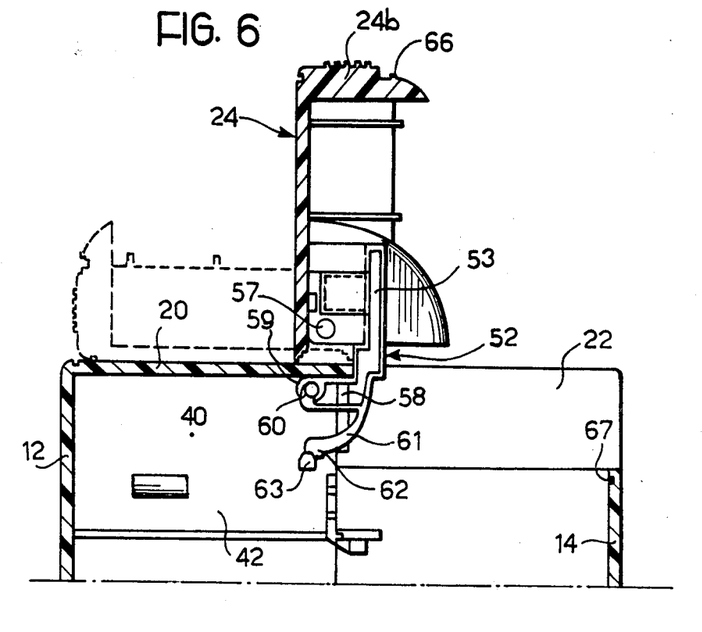
FIG. 6 is a section similar to FIG. 5, with the lid in the open position.

Referring now to FIGS. 4 to 6, the lid 24 is connected to the remainder of the casing 10 by means of a pair of hinges 52. The two hinges 52 are constituted by flat, shaped elements of moulded plastics material provided with a certain elasticity. Each hinge 52 comprises a plate part 53 from which projects a parallel tongue 54. The plate part 53 and the tongue 54, in the installed condition of the hinge 52, lie on either side of a flange 55 formed integrally with the lid 24. The two flanges 55 lie alongside the side walls of the recess 44.

When each of the hinges 52 is coupled with the respective flange 55, a hole 56 of the plate part 53 is engaged with a pin 57 constituted by a boss on the flange 55.

Each hinge 52 also includes a substantially L-shape part 58 which extends into the associated lateral space 38. Each L-shape part 58 has at its end a cylindrical lateral boss 59 which functions as a pivot pin. This pin, when the hinge is installed, is inserted into a corresponding, slightly oval hole 60 formed in the side wall 42 of the space 38.

From the L-shape part 58 there extends, towards the interior of the lateral space 38, a resilient arcuate projection 61 which has a small stop tooth 62 on its convex face. On the side wall 42 there is located, in a position underlying the hole 60, a stop projection 63 intended to cooperate with the arcuate projection 61.

The plate part 53 also has, in a position opposite the L-shape part 58, a notch or recess 64, and each flange 55 has a projection 65 complementary to the respective recess 64.

When the lid is closed, a right angled edge 24b thereof is in contact with the rear wall 14, as illustrated in FIG. 5. In this condition a longitudinal rib 66 on the upper edge of the wall 14 is snap engaged into a longitudinal groove 67 formed in the right angled edge 24b.

As illustrated in FIG. 5, when the lid 24 is closed the recesses 64 of the two hinges 52 are engaged with respective projections 65 so that these hinges cannot rotate about their pins 57. Instead, the hinges 53 can turn about their pins 59.

To open the lid 24 it is raised by uncoupling the groove 67 from the rib 66. This allows it to be turned to the raised position of FIG. 6. During this opening movement the convex sides of the arcuate projections 61 of the two hinges slide on the projections 63. Slightly before the lid 24 reaches the position of FIG. 4 in which it is raised at substantially 90° the small teeth 66 pass the projections 63 due to the elastic deformation of the projections 61. As will be understood, the teeth 62 rest against the projections 63 and prevent the lid 24 from closing under its own weight.

The lid 24 can be opened further, up to a rotation of through substantially 180° from its closed position, as illustrated in broken lines in FIG. 6 and in continuous lines in FIG. 2. This further rotation can be obtained by disengaging the recesses or notches 64 from the projections 65. Once this disengagement has taken place the lid 24 can in fact turn about its pins 57.

As can clearly be seen in FIG. 2, the lid 24 when in the 180° open position in which its upper wall 24a is resting on the fixed upper wall 20, is advantageously usable as a shelf for objects.

Figure 7:
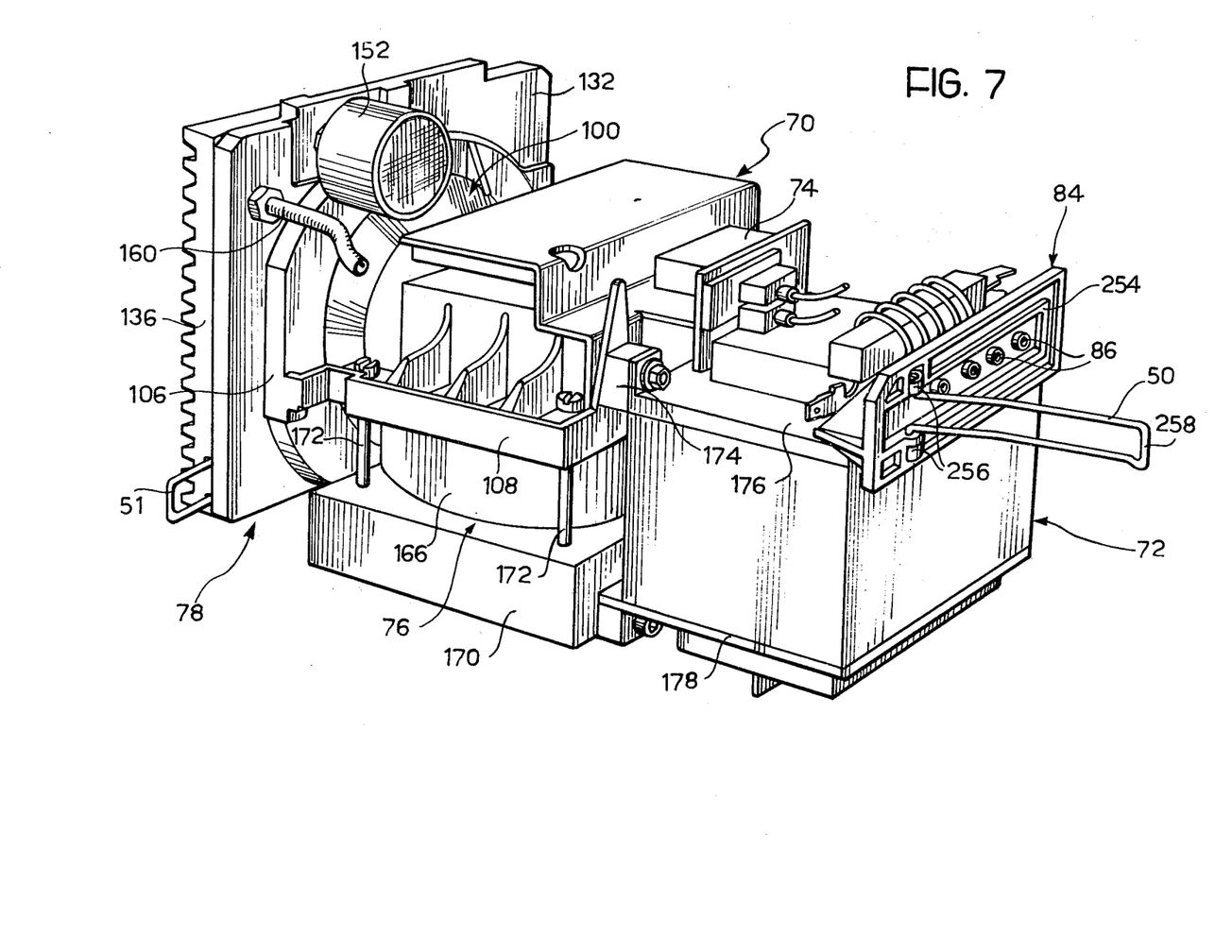
FIG. 7 is a perspective view of the operating units contained within the casing of FIGS. 1 and 2.
Figure 8:
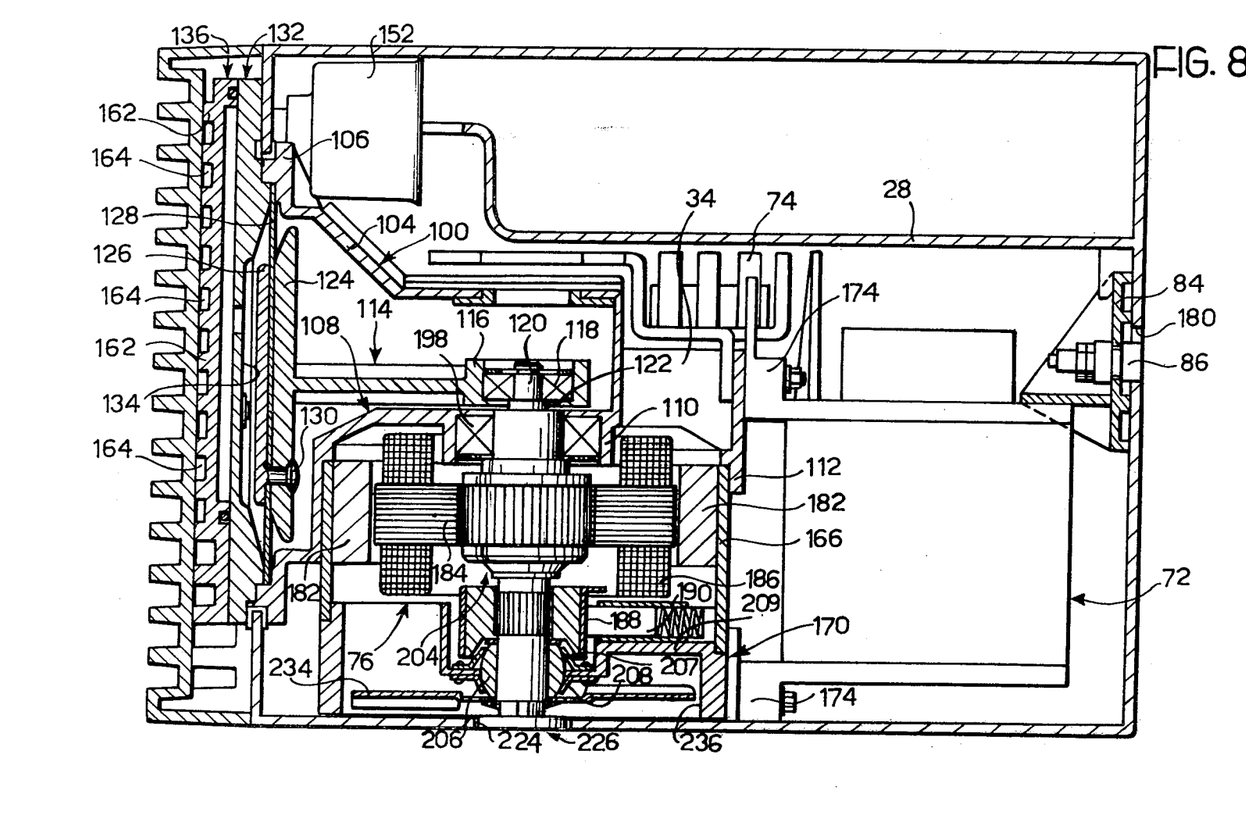
FIG. 8 is a sectional view on an enlarged scale taken on the horizontal plane indicated by the line of VIII—VIII of FIG. 1.
Figure 9:
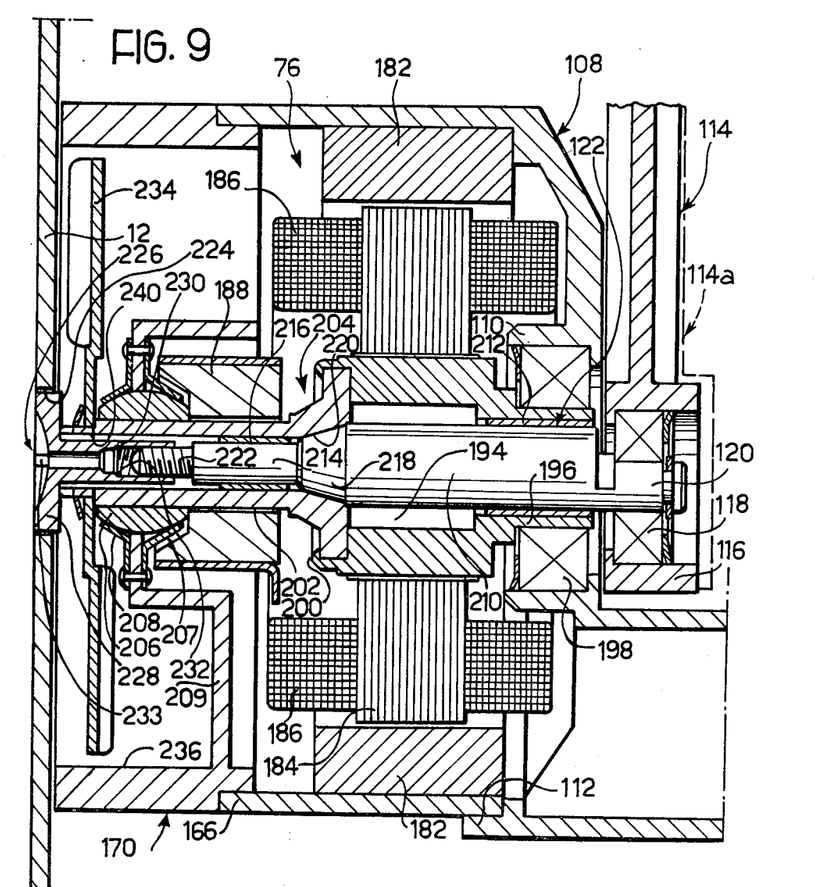
FIG. 9 is a further section, on an even larger scale, of a part of FIG. 8.

Refering to FIGS. 7 to 9, in the space 34 there is housed and fixed an operational unit 70 which comprises, as main components, a transformer 72, a rectifier 74, an electric motor 76 and an air compressor 78.

The motor 76 is of the low voltage d.c. type (preferably 12 V or else 24 V). The transformer 72 allows the motor 76 to be fed, via the rectifier 74, from a normal mains network, for example a 220 V, 50 Hz or 110 V 60 Hz supply. For supply from the mains the transformer 72 is provided with an electric connector cable 80 (FIGS. 1 and 2). The cable 80 can be stored in the form of a coil in one of the spaces 38 and, for use, can be made to pass through a notch 82 formed in the end wall 16 along its line of junction with the lid 24.

The operational unit 70 includes a connector plate 84 of plastics material which carries two pairs of electrical connector sockets 86 connected to the low voltage part of the electrical circuit, downstream of the rectifier 74. The two pairs of sockets 86 are usable as low voltage sockets for supplying a low voltage electrical utiliser downstream from the rectifier 74 as will be described below, or else for charging a battery from the mains. The same pair of sockets 86 are usable for supplying the electric motor 76 directly from a battery whenever an a.c. mains outlet is not available.

For linking the pairs of sockets 86 to a battery or an electrical utiliser there is provided another electrical cable 88 (FIG. 2) which can be put away in the form of a coil in the other space 38. The cord 88, in use, can also be passed through the notch 82.

Refering again to FIG. 1, in correspondence with the corner between the front wall 12 and the upper wall 20, there is formed in the casing 10 a recess 92 in which there is located a control knob 94 of a three-position switch for disconnecting the low tension circuit, downstream of the rectifier 74, or for selectively connecting this circuit to the motor 76 or to the sockets 86.

In the recess 92 there is also located a transparent window 96 under which there is situated the scale of an ammeter connected in the low tension circuit.

The same low tension circuit is provided with a thermal overload protection switch (not shown), the resetting push button 98 of which is located in the recess 92. Refering to FIGS. 7 to 9 and 11, the compressor 78 includes a casing 100 of plastics material. The casing 100 is constituted by a hollow body which comprises a flattened body portion 102 followed by a flared body portion 104. The flared body portion ends with an end flange 106 disposed laterally with respect to the motor 76.

Figure 11:
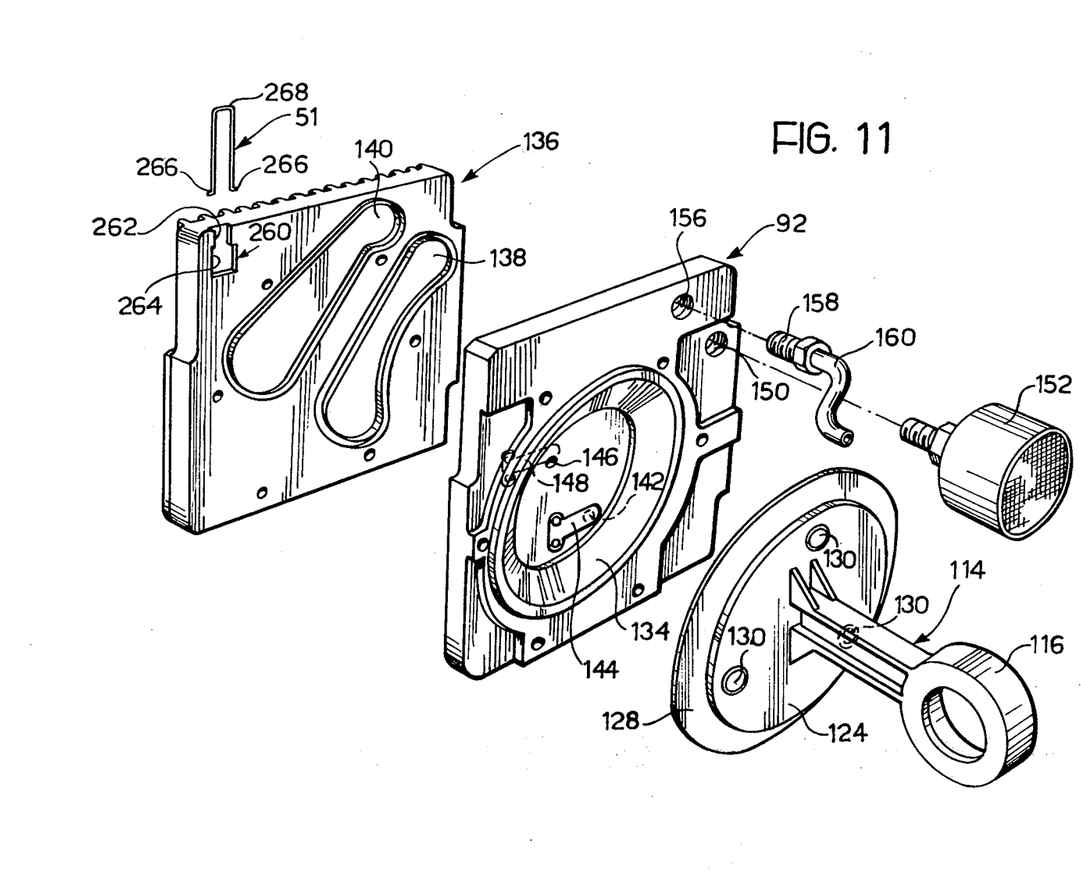
FIG. 11 is an exploded perspective view of the pneumatic compressor.

At the other end of the hollow body 100 the flattened body portion 102 has a slotted lateral flange 108. This flange constitutes one of the end plates of the electric motor 76. The flange 108 includes, among other things, a central bush 110 and a peripheral skirt 112.

In the hollow body 100 of the compressor 78 there is located a connecting rod 114 of moulded plastics material. The connecting rod 114 has an annular head 116 is the eye of which there is fixed the outer ring of a ball bearing 118. The inner ring of the bearing 118 is fixed on to a crank pin 120 which forms part of a drive shaft 122 for the compressor. The details of the shaft 122 will be described below. For now, it is enough to say that the axis of the shaft 122 coincides with the axis of the motor 76.

The end of the connecting rod 114 opposite the head 116 is shaped as a disc 124. Between the disc 124 and a clamping disc 126 of plastics material is enclosed a central part of a flexible diaphragm 128. The disc 124 and clamping disc 126 are fixed together, with the interposition of the central part of the diaphragm 128, by means of studs 130 integrally formed with the clamping disc 126 and upset ultrasonically.

The flange 106 faces towards the finned wall 22. The periphery of the diaphragm 128 is sealingly clamped between the flange 106 and a plate 132 of light alloy which constitutes the compressor head. In the face of the plate 132 facing the diaphragm 128 there is formed, opposite the clamping disc 126, a recess 134 of flattened frustoconical form. The recess 134 is closed by the diaphragm 128 and defines with it a compression chamber.

To the face of the plate 132 opposite that facing the diaphragm 128 there is sealingly applied a further plate 136 of light alloy. The plate 136 serves as a collector and in its face facing towards the plate 132 there are formed two flattened recesses 138 and 140 of shaped outline. The recess 138 serves as an induction duct and communicates with the compression chamber by means of a through hole 142 formed in the plate 132. The hole 142 is controlled by a flap valve 144 openable towards the interior of the compression chamber.

The recess 140 constitutes an exhaust duct and communicates with the compression chamber by means of a through hole 146. The hole 146 is controlled by a flap valve 148 openable towards the recess 140.

The collector or induction recess 138 also communicates with a through hole 150 formed in the head 132 in a zone thereof to one side of the recess 134. The interior of an induction filter 152, through which air being drawn into the interior of the casing 10 is made to pass, communicates with the hole 150. Induced external air penetrates into the casing 10 through a perforated zone 154 of the wall 12 (FIG. 1). The holes of the perforated zone 154 communicate in part with the space 34 with which the inlet mouth of the filter 152 also communicates. The arrangement of the filter 152 within the casing 10 is advantageous since the casing itself behaves as an induction silencer.

The exhaust collector or recess 140 communicates with a threaded hole 156 formed in the plate or head 132 adjacent the hole 150. In the hole 156 there is screwed the threaded part of a coupling 158 to which is connected a flexible tube 160. The tube 160, when not in use, is stored in the vertical part 36 of the space 36–38 (FIGS. 2 and 3).

As will be understood, the assembly constituted by the disc part 124 of the connecting rod 114, the diaphragm 128, the clamping disc 126 and the two plates 132, 136 has a very compact or flat configuration which occupies very little space behind the finned wall 22 and closely adjacent the latter.

The plate 136 has a finned outer face the fins 162 of which are parallel to one another and are vertical in the position of use of the unit. The crests of the fins 162 are situated against an inner flat face of the finned wall 22 of plastics material, or closely adjacent this wall. In this way the spaces between the fins 162 define a series of vertical chimneys 164; these chimneys 164 communicate with the outside environment at their upper and lower ends so that, by the effect of the heat developed during operation of the compressor, an ascending flow of air arises in the chimneys 164, which provides for the dissipation of the major part of this heat. The heat generated by the compressor 78 is further dissipated by the external fins of the wall 22 of plastics material. This wall 22, which in operation of the compressor never reaches a temperature dangerous to the hands, further constitutes an efficient protection against burning.

Refering to FIGS. 7 to 9, in the skirt 112 of the lateral flange or end plate 108 there is embedded one end of a tubular stator casing 166 of the electric motor 76. In the other end of the casing 166 there is embedded a further perforated end plate 170. The assembly comprising the two end plates 108, 170 and the casing 166 is clamped together by screws 172.

The two end plates 108 and 170 have a substantially square form and on their sides opposite those facing the end plates of the compressor 78 there are bolted corresponding feet 174 which form part of the side frames 176, 178 of the transformer 72. To the side frames 176 there are fixed, among other things, the rectifier 74 and the connector plate 84. This latter is arranged to be accessible through a window 180 formed in the wall 16 (FIGS. 1, 2 and 8), under the notch 82. Further details of the connector plate 84 will be dealt with below.

To the inner surface of the casing 166 there are fixed permanent magnets 182. The rotor of the motor 76 comprises a stack of laminations 184 with the associated windings 186 which terminate at a collector 188 fed by brushes such as 190 carried by the end plate 170.

The rotor stack 184 is carried by a hollow hub 192 of large diameter. Within the hub 192 there is defined a cylindrical chamber 194. A tubular projection 196 of the hub 192, directed towards the flattened body portion 102 of the body of the compressor, is coupled with the inner ring of a rolling element bearing 198 the outer ring of which is coupled to the bush 110 of the end plate or lateral flange 108.

To the other end of the hub 192 there is fixed, by means of a flange 200, another tubular projection 202 on which there is keyed the collector 188. As will be understood, the shaft of the electric motor 76 is constituted jointly by the hub 194 and by its projections 196 and 202. For simplicity, all this hollow shaft will be indicated below by the reference 204. The tubular projection 202 is rotatably mounted in a bush 206 with spherical external surfaces. The bush 206 is, in turn, mounted with the possibility of angular oscillation between a pair of resilient cup elements 207 and 208 fixed to a central zone of a radial wall 209 of the end plate 170. This arrangement permits a correctly centered rotation of the hollow shaft 204 despite small defects in the alignment of the bush 110 and of the cup elements 207 and 208.

The shaft 122 of the compressor comprises a cylindrical body portion 210 which extends from the crank pin 120 through the tubular projection 196 and into the chamber 194. The cylindrical body portion 210 is rotatably and coaxially slidably mounted in the projection 196 with the interposition of a bearing bush 212. From the end of the shaft 210 extends a cylindrical body portion of smaller diameter which projects coaxially into the projection 202 where it is rotatably and slidably mounted with the interposition of a bearing bush 216.

The coupling zone between the two body portions 210, 214 of the shaft 122 is defined by a ground external conical surface 218. The flange 200 has a ground inner frusto-conical surface 220 able to cooperate with the frusto-conical surface 218. As will be better understood below, the two frusto-conical surfaces 218, 220 constitute an axial clutch which permits the shaft 122 of the compressor to be coupled to and uncoupled from the shaft 204 of the motor.

The body portion 214 of the shaft 122 has at its free end an external threaded portion 222. In the front wall 12 there is formed a circular hole 224 coaxial with the two shafts 204 and 122. In this hole 224 there is insertable a screw member 226. The screw member 226 has a circular head 228 of smaller diameter than that of the hole 224, and a hollow stem 230. The hollow stem 230 has an internal threaded portion 232 engagable onto the threaded end portion 222 of the shaft 122 of the compressor. The head 226 of the screw member has a slot 233 which permits the screw member itself to be turned by a coin or the like. With the stem 230 of the screw member inserted in the tubular projection 202 of the hollow shaft, screwing of the screw member 226 causes axial displacement of the shaft 122 of the compressor towards the left (in FIG. 9) resulting in a rigid coupling between the two frusto-conical surfaces 218 and 220. In these conditions the screw member 226 is located in the position in which it is illustrated in FIG. 9, with its head 228 situated in the aperture 224.

In these conditions, in which the conical clutch 218, 220 is engaged, as shown in FIG. 9, the hollow shaft 204 of the motor 76 is rigidly connected for rotation with the shaft 122 of the compressor 78 so that this latter is usable. The rotation of the head 228 in the aperture 224 constitutes a visual indication to the user that the compressor is in operation.

It should be noted that the coupling of the two frusto-conical surfaces 218 and 220, as well as connecting the two shafts 122 and 204 rigidly together, improves their coaxial allignment. As will be noted from FIGS. 8 and 9, when the operating unit 70 is installed in the casing 10, the hollow shaft 204 of the motor 76 is orientated with its axis normal to the front wall 12 and its body portion 202 extends up to a point immediately behind the wall 12. In this zone, an end of the body portion 202 projects with respect to the end plate 170 and carries a fan 234. The fan 234 is situated within an annular cavity 236 of the end plate 170 and is located immediately behind the perforated region 154 of the wall 12. Some of the holes of this region communicate with the interior of the casing 116 of the motor by means of slots in a transverse wall 238 of the end plate 170. The interior of the casing 166 communicates in turn with the interior of the space 34 through slots in the endplate 108.

Others of the holes in the perforated zone 154 communicate directly with the space 34. In use of the motor 76 the compressor 78 draws air from the space 34 after this has cooled both the motor 76 and the transformer 72 and the rectifier 74. At its end facing the front wall 12 the body portion 202 of the hollow shaft 204 has an internally threaded seat 240 which surrounds the threaded end 222 of the shaft 122 of the compressor. When the screw member 226 has been removed, the threaded seat 240 is accessible for screwing on the drive spigot or terminal attachment 242 (FIGS. 1 and 9). The spigot 242 has an external threaded portion 244 corresponding to that of the seat 240. The spigot 242 forms part of a flexible transmission shaft 246 (FIG. 1) or similar transmission member which will be discussed below. The seat 240 therefore constitutes a mechanical power take-off by means of which the motor 76 can drive various accessories or other equipment, examples of which will be given below. The sense of rotation of the motor 76 will be naturally such as to tend to screw the spigot 242 into the seat 240.

When the power take-off of the unit is utilised, it is not convenient to maintain the compressor 78 in operation given that this latter would absorb power wastefully, with possible over-heating of the motor 76 and a consumption of electrical energy which could be unacceptable in the case of supply from a battery. To stop the operation of the compressor 78, a threaded end 222 of the shaft 122, situated within the threaded seat 240, has a rounded point 248. In the free end part of the spigot 242 there is formed a seat 240 in which there is fixed an insert 252 of hard plastics material having a low coefficient of friction, such as, for example, a polyamide material impregnated with molybdenum disulphide. The insert 252 has a flat thrust face 254.

Figure 10:
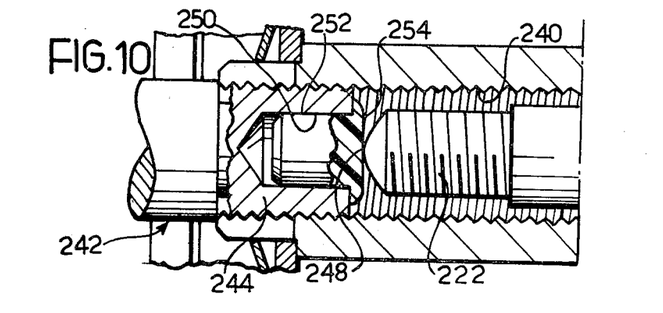
FIG. 10 is a fragmentory section of the shafts of FIG. 9 in the condition in which a drive spigot of an external mechanical spacing utiliser is coupled to the motor shaft.

When the spigot 242 is screwed to the bottom of the seat 240, the insert 252 engages the point 248 (FIG. 10) and the whole of the shaft 122 of the compressor is pressed to the right of FIGS. 9 and 10. This movement of the shaft 122 disengages the frusto-conical surface 218 from the frusto-conical surface 220 so that the shaft 204 of the motor 76 is no longer able to drive the shaft 122 of the compressor 78 to rotate. At this point it is necessary to observe that the driving couple exerted on the shaft 122 by the bearing bushes 212 and 216, as well as by the thrust face 254 and the rounded point, 242 have practically no effect.

In the movement of the shaft 122 towards the right, which is of the order of a millimeter, the pin 120 and its bearing 118 are also displaced towards the right with a corresponding displacement of the head 116 of the connecting rod 114. Following this displacement, the connecting rod 114 assumes a slightly oblique disposition, as indicated in broken lines 114a in FIG. 9, but this inclination is permitted in part by the normal play of a ball bearing, such as the bearing 118, and in part by the flexibility of the diaphragm 128. If the ball-type bearing 118 were not able to permit the necessary angular deviation of the connecting rod 114 with respect to its general plane normal to the pin 120, a bearing of the oscillating type could be adopted.

There will now be described the manner in which the two loops 50 and 51 for attachment of the clips 49 (FIGS. 1 and 2) of the shoulder belt 48 are connected to the unit. Refering to FIG. 7, the connector plate 84 which carries the sockets 86 has, around these latter, a U-shape groove 254. At the ends of the arms of the U respective aligned bush parts 256 are formed in the connector plate 84. The metal-wire loop 50 has a U-shape configuration such that it can be received in the groove 254. The ends of its arms are bent outwardly and inserted into the bush parts 256. The transverse part 258 which joins the two arms of the loop 50 is bent outwardly in such a way as to project slightly with respect to the connector plate 84 when the loop is inserted in the groove 254.

When installed, the loop 50 is accessible through the window 180 of the end wall 16 and can be made to turn outwardly by engaging the projecting transverse part 258 with the end of a finger, after which it is possible to hook one of the clips 49 onto the loop 50.

Refering to FIG. 11, in a corner region of the plate 96 there is formed a seat 260. This seat has a lower section 262 which opens out onto the upper edge of the plate 136. The seat 260 also has an inner enlarged part 264. The metal-wire loop 51 is U-shaped and the ends of its arms are bent outwardly at right angles, as indicated at 266. The loop 51 is maintained in position in the seat 260 by the fact that this is closed by the plate 132. In this condition, the arms of the loop 51 can slide in the part 262 of the seat, whilst the outwardly bent end 266 cannot escape from the enlarged part 264. When it is not in use, the loop 51 is inserted into the bottom of the seat 260 and its transverse section 268, which joins the arms (the bight portion) is accessible on the upper edge of the finned plate 22. To utilise the loop 51 for the purpose of hooking onto it one of the clips 49, it is sufficient to pull it upwardly by engaging the transverse section 268 with the end of a finger.

The unit illustrated is usable for various functions thanks to the possibility of supplying three types of energy: pneumatic, mechanical and electrical (d.c.).

The following is a description of several of the numerous possibilities of application:

The distribution of compressed air allows, for example, with the use of suitable tools, the inflation of motor vehicle tyres, inflatable dinghies, balloons and the like; spray painting; the execution of fine decorations by means of an air brush; the re-touching of photographs and drawings by means of an air pen; pressure washing; cleaning by means of a jet of air; whipping cream; spraying of food substances, especially for confectionery atomisation of substances, such as deodorants and disinfectants in the atmosphere; spraying of fungicides.

The mechanical power take-off constituted by the threaded seat 188 of the shaft 156 of the motor 76 permits, for example, by means of a flexible transmission shaft such as 198 or a like member, the driving of a drill, a screwdriver and numerous other tools; the driving of a turbine pump for pumping liquid, watering or for emptying the bilge of a boat. By means of the low tension d.c. socket 86 it is possible to re-charge the battery of a motor vehicle or of a small boat, to supply tools such as drills and screwdrivers as well as electrical toys.

In practice there is envisaged the use of an electrical motor 76 of a power in the region of 140W. A motor of this power is sufficient to drive a compressor such as 78 in such a manner as to distribute about 40l/min and provide a pressure of about 3.5 atmospheres.

The space 36-40 constitutes a receptacle for disposing both the electrical leads 80, 88 and the tubing 160 when the unit is not in use or during transport. Moreover, the user can utilise the space 36-38 for carrying any other accessories or tools that he wishes.

All the assembly can be contained in a casing 10 of small dimensions, for example 240X170X170 mm, all having an easily transportable weight of about 5 Kg.

I claim:

1. In a portable power supply unit, of the type comprising a casing in the form of a portable, substantially parallelepiped box in which there are installed a transformer—rectifier combination and a low voltage d.c. electric motor which can be selectively supplied from a battery or from an a.c. mains network by means of the transformer—rectifier combination downstream from the rectifier there being further connected at least one socket for the distribution of low voltage d.c., electrical energy to external utilisers and for supplying the motor from the battery, and in which the shaft of the electric motor extends perpendicular to a side wall of the casing and has, at an end accessible through an opening of this wall, a power take-off connectable to a mechanical utiliser, there being associated with the unit a reciprocating pneumatic compressor which can be driven by the motor the improvement wherein the reciprocating pneumatic compressor is installed in the casing and the shaft of the compressor is mounted coaxially in the shaft of the motor and is coupled to the shaft of the motor by means of a clutch there being provided means for disengaging the clutch to prevent the shaft of the compressor from being rotated by the shaft of the motor when a mechanical utiliser is coupled to the power take-off.

2. A unit as claimed in claim 1, wherein the compressor is of the diaphram type and its shaft has a crank pin extending from the side of the motor opposite that facing the said side wall and to the crank pin there is coupled a head of a connecting rod the end of which opposite the head is constituted by a rigid disc fixed to a central part of the diaphragm.

3. A unit as claimed in claim 2, wherein the shaft of the motor is hollow, the power take-off is constituted by a terminal coupling seat the interior of which communicates with the cavity in the shaft and in which there is connectable a drive spigot for driving the mechanical utiliser, the shaft of the compressor is coaxially slidably and rotatably mounted in the shaft of the motor and has an end opposite the crank pin which is situated in the coupling seat and is engageable by the drive spigot the shaft of the compressor is connected to the shaft of the motor by means of an axial clutch and the head of the connecting rod of the compressor is coupled to the crank pin by means of a bearing which allows an angular deviation of the connecting rod with respect to a general plane normal to the pin the arrangement being such that the full insertion of the drive spigot into the coupling seat causes a displacement of the shaft of the compressor such as to disengage the axial clutch.

4. A unit as claimed in claim 3, wherein the axial clutch is a conical clutch the elements of which are constituted by respective frusto-conical surfaces formed on respective shafts.

5. A unit as claimed in claim 4, wherein the shaft of the compressor has an external threaded portion on an end thrust-engageable with the drive spigot and said threaded end portion, and further comprising a screw member having a hollow stem with an internal threaded portion engageable with the said external threaded portion and a head able to press against the corresponding end of the shaft of the motor, the clamping of the screw member having the effect of exerting on the shaft of the compressor a tension such as to maintain the frusto-conical surfaces of the clutch in engagement with one another.

6. A unit as claimed in claim 3 wherein the engageable end of the shaft of the compressor has a rounded point and the corresponding end of the rotary drive spigot is provided with an insert of material having a low coefficient of friction, intended to engage frontally with the said rounded point to maintain the shaft of the compressor in the displaced position corresponding to disengagement of the clutch.

7. A unit as claimed in claim 3, wherein said terminal coupling seat has an internally threaded portion and the rotary drive spigot has a corresponding externally threaded portion, the sense of rotation of the shaft of the motor being such as to favour tightening of the screw of the spigot into the seat.

8. A unit as claimed in claim 2, wherein the compressor includes an end frame in the form of a plate in a face of which directed towards the diaphragm there is formed a flattened recess closed by the diaphragm and which defines therewith a compression chamber, and further comprising a collector in the form of a plate applied to the face of the end plate opposite that facing the diaphragm and in the face thereof which faces towards the end plate there are formed two flattened recesses having shaped outlines and serving respectively as induction and exhaust ducts, each of these ducts communicating at one end with the exterior and at the other end with the compression chamber by means of respective through holes formed in the end plate and with which there are associated respective flap valves.

9. A unit as claimed in claim 8, wherein the compressor includes a casing containing the connecting rod and which has at one end a flange for fixing the end plate and, in correspondence with the other end, a lateral flange constituting one of the end plates of the electric motor, the two flanges being orientated in planes generally perpendicular to one another and the lateral flange having a central bush for housing a bearing for the hollow shaft of the motor and a peripheral skirt in which one end of a stator casing of the motor is embedded.

10. A unit as claimed in claim 8, wherein the plate constituting the collector has a finned outer face the fins of which are parallel to one another and are vertical in the position of use of the unit, and by the fact that the casing has a lateral wall of plastics material resistant to heat, which wall is externally finned and has an inner face situated against the crest of the fins of the plate or closely adjacent to these, in such a way as to define with the spaces between these fins a series of vertical chimneys communicating with the external environment at their upper and lower ends for the circulation of cooling air.

11. A unit as claimed in claim 10, wherein the said lateral wall of the casing which has the aperture for access to the power take-off is a wall adjacent to the finned wall of plastics material.

12. A unit as claimed in claim 1, wherein the casing is sub-divided into a space which contains the electric motor, the compressor, the transformer and the rectifier, and a receptacle space accessible by means of an openable lid which constitutes an upper part of the casing, this receptacle space being able to receive one or more electrical connector cables as well as a flexible tube for the compressor output and possible other tools or accessories.

13. A unit as claimed in claim 12, wherein the receptacle space includes an upper part extending horizontally under an upper fixed part of the casing and a part extending vertically along the interior of a lateral wall of the casing.

14. A unit as claimed in claim 13, wherein the upper part of casing is sub-divided along a median line into a portion constituted by the said fixed upper wall and a portion constituted by an upper wall of the lid and wherein under the fixed upper wall there is formed a central niche for insertion of the fingers of a hand, the upper wall having, adjacent the niche, an enlarged edge constituting the said carrying handle, and with the niche there corresponds a recess in the upper part of the lid for the passage of the fingers, the said niche subdividing the said upper part of the receptacle space into a pair of spaces situated on the two sides of the niche itself.

15. A unit as claimed in claim 13, wherein the lid is hinged substantially along the said median line so as to be able to be turned back to a position in which its upper wall is lying on the fixed upper wall and the lid serves as a shelf for receiving objects.

* * * * *